(12) United States Patent
Fujiwara et al.

(10) Patent No.: US 11,592,667 B2
(45) Date of Patent: Feb. 28, 2023

(54) DISPLAY SYSTEM AND DISPLAY CONTROL METHOD

(71) Applicant: PANASONIC INTELLECTUAL PROPERTY CORPORATION OF AMERICA, Torrance, CA (US)

(72) Inventors: Nanami Fujiwara, Osaka (JP); Yuichi Hasegawa, Hyogo (JP); Takeshi Kawaguchi, Cupertino, CA (US)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 0 days.

(21) Appl. No.: 17/380,245

(22) Filed: Jul. 20, 2021

(65) Prior Publication Data

US 2021/0364793 A1 Nov. 25, 2021

Related U.S. Application Data

(63) Continuation of application No. PCT/JP2020/041414, filed on Nov. 5, 2020.

(60) Provisional application No. 63/028,307, filed on May 21, 2020.

(51) Int. Cl.
*G02B 27/01* (2006.01)
*G09G 5/10* (2006.01)

(52) U.S. Cl.
CPC ........... *G02B 27/0101* (2013.01); *G09G 5/10* (2013.01); *G02B 2027/014* (2013.01); *G09G 2300/023* (2013.01)

(58) Field of Classification Search
CPC .............................................. G09G 2320/0646
See application file for complete search history.

(56) References Cited

U.S. PATENT DOCUMENTS

| 2014/0118336 | A1* | 5/2014 | Smithwick | G02B 30/27 345/419 |
| 2014/0185129 | A1 | 7/2014 | Kim et al. | |
| 2016/0154535 | A1* | 6/2016 | Kavli | G06F 1/1684 345/177 |

FOREIGN PATENT DOCUMENTS

| CN | 103676257 A | 3/2014 |
| CN | 110928046 A | 3/2020 |
| JP | 2006-132206 A | 5/2006 |
| JP | 2013-142804 A | 7/2013 |
| JP | 2016-088187 A | 5/2016 |

(Continued)

OTHER PUBLICATIONS

International Search Report issued in International Patent Application No. PCT/JP2020/041414, dated Jan. 19, 2021.

*Primary Examiner* — Nan-Ying Yang
(74) *Attorney, Agent, or Firm* — McDermott Will & Emery LLP (57) ABSTRACT

A display system includes: a transparent display; a dimming panel located behind the transparent display and capable of adjusting transmissivity; and a processor, wherein, when the processor detects an object located behind the dimming panel, the processor displaying an image on the transparent display, setting the transmissivity of a region of the dimming panel located in front of the object higher than the transmissivity of a region of the dimming panel located behind a region on which the image is displayed, and making different a degree of an increase of the transmissivity in accordance with combination of the image and the object.

6 Claims, 9 Drawing Sheets

(56) References Cited

FOREIGN PATENT DOCUMENTS

KR 10-2015-0047191 A 5/2015

* cited by examiner

| IMAGE INFORMATION | | | | TYPE OF OBJECT | RELEVANCE | IMAGE TRANSMISSIVITY | OBJECT TRANSMISSIVITY | |
|---|---|---|---|---|---|---|---|---|
| IMAGE DATA | CONTENT | TYPE | DISPLAY POSITION | | | | | |
| STILL IMAGE DATA | MOON | CELESTIAL BODY | (X1,Z1) | CACTUS | 4 | 10% | 50% | ~21 |
| MOVING IMAGE DATA | BUTTERFLY | LIVING THING | (X2,Z2) | CACTUS | 5 | 20% | 70% | ~22 |
| MOVING IMAGE DATA | BUTTERFLY | LIVING THING | (X2,Z2) | BUILDING BLOCK | 3 | 20% | 50% | ~23 |
| STILL IMAGE DATA | DESERT | ENVIRONMENT | (X4,Z4) | CACTUS | 3 | 40% | 70% | ~24 |

DISPLAY SYSTEM AND DISPLAY CONTROL METHOD

CROSS-REFERENCE OF RELATED APPLICATIONS

This application is the U.S. National Phase under 35 U.S.C. § 371 of International Patent Application No. PCT/JP2020/041414, filed on Nov. 5, 2020, which in turn claims the benefit of U.S. Application No. 63/028,307, filed on May 21, 2020, the entire disclosures of which Applications are incorporated by reference herein.

TECHNICAL FIELD

The present disclosure relates to a display system and a display control method.

BACKGROUND ART

There has been known a transmissive display device for a vehicle which is developed for calling an attention of a driver so that the driver's line of sight is directed to an object of attention itself without obstructing a field of view of the driver to the scenery outside the vehicle (see, for example, Patent Literature 1).

However, the technique disclosed in Patent Literature 1 emphasizes safety, and does not enhance the visibility of both an image and an object.

CITATION LIST

Patent Literature

Patent Literature 1: JP 2016-88187 A

SUMMARY OF INVENTION

The present disclosure has been made to overcome such a drawback, and it is an object of the present disclosure to provide a display system and a display method capable of ensuring the visibility of both an image and an object.

A display system according to one aspect of the present disclosure includes: a transparent display; a dimming panel located behind the transparent display and capable of adjusting transmissivity; and a processor, wherein, when the processor detects an object located behind the dimming panel, the processor displaying an image on the transparent display, setting the transmissivity of a region of the dimming panel located in front of the object higher than the transmissivity of a region of the dimming panel located behind a region on which the image is displayed, and making different a degree of an increase of the transmissivity in accordance with combination of the image and the object.

DESCRIPTION OF EMBODIMENTS (Findings Underlying the Present Disclosure)

In recent years, there has been known a technique which uses a display having transmitting property where transmissivity is adjustable. Specifically, the display includes: a transparent display; and a dimming panel located behind the transparent display and capable of adjusting transmissivity. The present inventors have studied the rendition of a room (space) in a building such as a residential house by using such a display.

However, when the transmissivity of an entire surface of the dimming panel is increased, although the visibility behind the display is improved, the visibility of an image displayed on the transparent display is deteriorated. On the other hand, when the transmissivity of the entire surface of the dimming panel is lowered, although the visibility of the image displayed on the transparent display is improved, the visibility of the object located behind the transparent display is deteriorated.

Patent Literature 1 discloses a technique in which, for calling an attention of a driver so that the driver's line of sight is directed to a target of attention itself without obstructing a field of view of the driver to the scenery outside a vehicle, transmissivity of a region which includes an object is set relatively higher than transmissivity of other regions. However, although this technique ensures the visibility of the object, there is a concern that the visibility of the image is not ensured.

In view of the above circumstances, the present inventors have made extensive studies on the way to ensure the visibility of both an image and an object and, as a result of such extensive studies, the present inventors have arrived at respective aspects of the present disclosure described below.

A display system according to one aspect of the present disclosure includes: a transparent display; a dimming panel located behind the transparent display and capable of adjusting transmissivity; and a processor, wherein, when the processor detects an object located behind the dimming panel, the processor displaying an image on the transparent display, setting the transmissivity of a region of the dimming panel located in front of the object higher than the transmissivity of a region of the dimming panel located behind a region on which the image is displayed, and making different a degree of an increase of the transmissivity in accordance with combination of the image and the object.

A display control method according to one aspect of the present invention is a display control method which uses a display system including: a transparent display, a dimming panel located behind the transparent display and capable of adjusting the transmissivity, and a processor, wherein, when the processor detects an object located behind the dimming panel, the processor displaying an image on the transparent display, setting the transmissivity of a region of the dimming panel located in front of the object higher than the transmissivity of a region of the dimming panel located behind a region on which the image is displayed, and making different a degree of an increase of the transmissivity in accordance with combination of the image and the object.

According to these aspects, the transmissivity of the region of the dimming panel located in front of the object is set higher than the transmissivity of the region of the dimming panel located behind the region on which the image is displayed, at a degree corresponding to the combination between the image and the object. Therefore, in this aspect, in consideration of the visibility when a user views the image and the object in combination, it is possible to properly set the transmissivity of the region located in front of the object higher than the transmissivity of the region located behind the region on which the image is displayed. Thereby, in this aspect, the visibility of both the image and the object can be ensured.

In the above aspect, when the display position of the image is moved, following the movement of the display position of the image, the processor may change the transmissivity of the region of the dimming panel located behind the region on which the image is displayed.

According to this aspect, following the movement of the display position of the image, the transmissivity of the region of the dimming panel located behind the region on which the image is displayed is changed. Therefore, in this aspect, it is possible to ensure the visibility of an image such as a moving image in which a display position of the image moves.

In the above aspect, the processor may change the transmissivity of the dimming panel in accordance with a distance from the region located behind the region on which the image is displayed.

In this aspect, the transmissivity of the dimming panel changes in accordance with the distance from the region located behind the region on which the image is displayed. Therefore, in this aspect, the image can be harmonized with the space by increasing the transmissivity of the dimming panel as the distance from the region located behind the region on which the image is displayed increases.

In the above aspect, a case is considered where the object is formed of a plurality of objects, a relevance is defined between the image and each of the plurality of objects, and the processor detects a first object located behind the dimming panel, and a second object located behind the dimming panel and having a lower relevance with the image than the first object. In this case, the processor may set the transmissivity of the region of the dimming panel located in front of the first object higher than the transmissivity of the region of the dimming panel located in front of the second object.

In this aspect, the transmissivity of the region located in front of the first object is set higher than the transmissivity of the region located in front of the second object having a lower relevance with the image than the first object. Therefore, in this aspect, for example, the object having a low relevance with the image is blurred, and the object having a high relevance with the image is made conspicuous. Accordingly, the visibilities of a plurality of objects are properly adjusted in accordance with the relevance of each object with the image.

In the above aspect, the processor may change the transmissivity of the dimming panel in accordance with a distance from the region located in front of the object.

In this aspect, the transmissivity of the dimming panel changes in accordance with the distance from the region located in front of the object. Therefore, in this embodiment, the object can be harmonized with the space by increasing the transmissivity of the dimming panel as the dimming panel approaches the region located in front of the object.

In the above aspect, the image may include a first image and a second image, and the processor may make the transmissivity of the region of the dimming panel located behind the region on which the first image is displayed and the transmissivity of the region of the dimming panel located behind the region on which the second image is displayed different from each other.

In this embodiment, the transmissivity of the region located behind the region on which the first image is displayed and the transmissivity of the region located behind the region on which the second image is displayed are made different from each other. Therefore, in this aspect, for example, the visibilities of a plurality of images are properly adjusted in accordance with the combination of the plurality of images with the object by blurring the image which is not desirable to be viewed together with the object and making the image which is desirable to be viewed together with the object conspicuous.

First Embodiment

[1-1. Structure of Display System]

Figure 1:
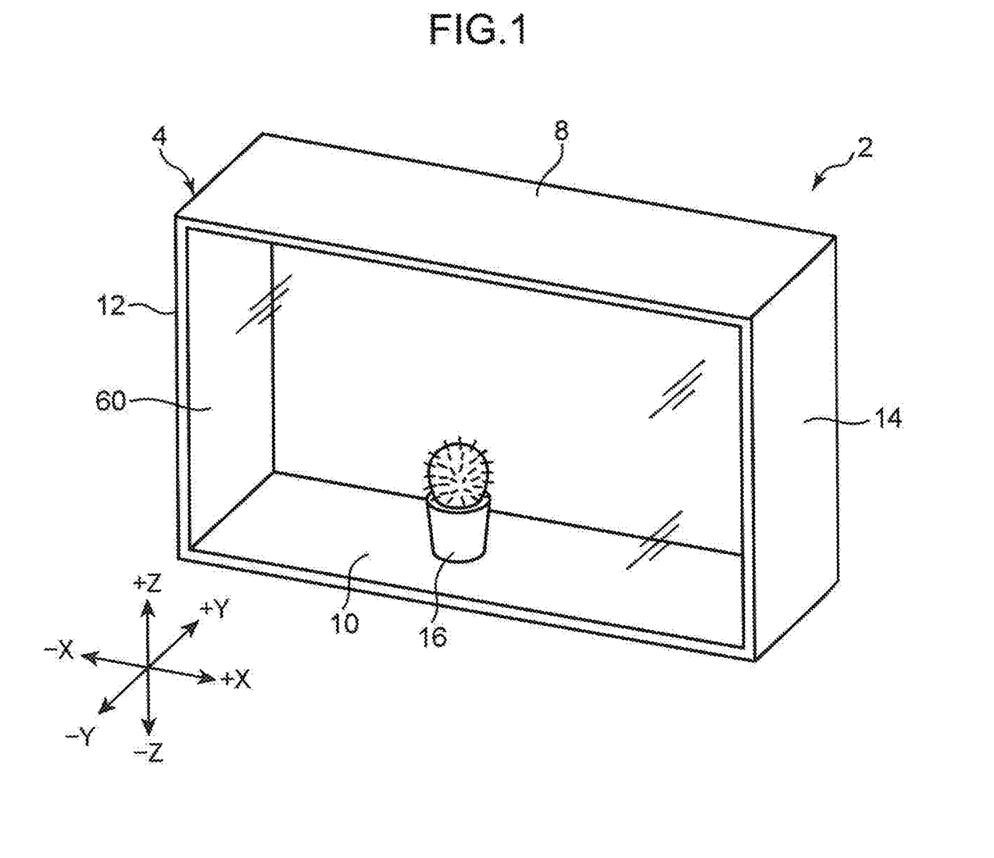
FIG. 1 is a perspective view showing a display system according to a first embodiment.
Figure 2:
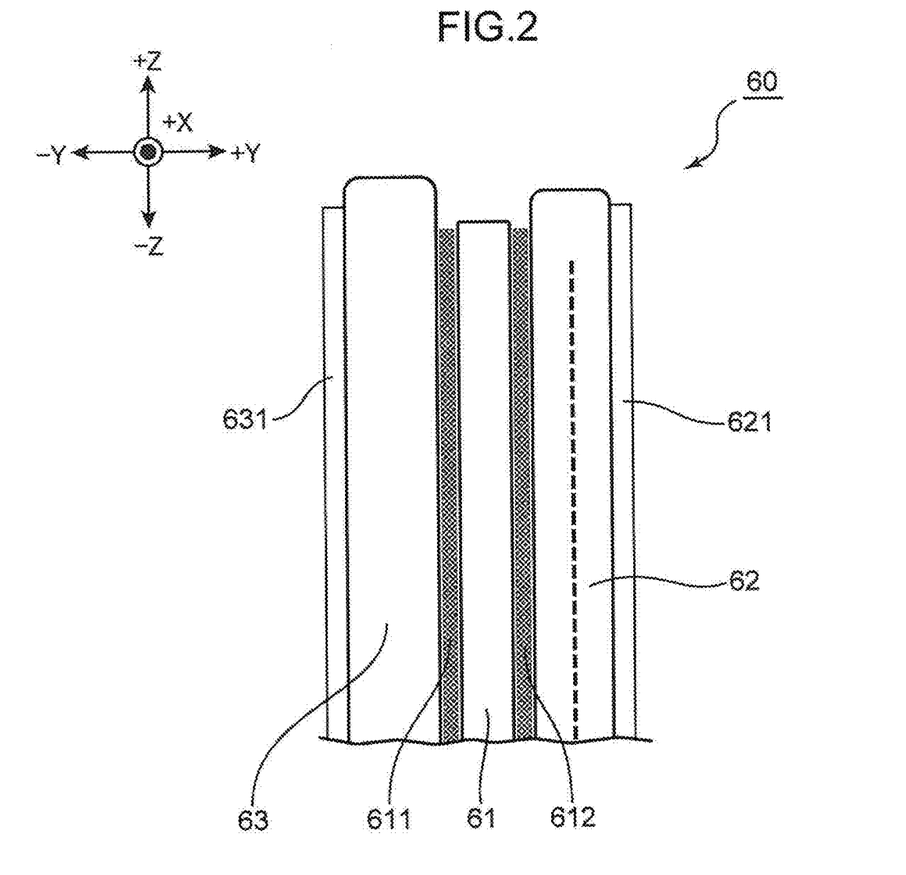
FIG. 2 is a side view of the display.

First, the structure of a display system 2 according to a first embodiment will be described with reference to FIGS. 1 and 2. FIG. 1 is a perspective view showing the display system 2 according to the first embodiment. FIG. 2 is a side view of a display 60.

In the description made hereinafter, as shown in FIGS. 1, 2 and the like, three directions which are orthogonal to each other in the display system 2 are indicated by using an X-axis direction, a Y-axis direction and a Z-axis direction which are parallel to an X-axis, a Y-axis and a Z-axis which are orthogonal to each other. Specifically, the left-right direction of the display system 2 is set as the X-axis direction, where the −X direction is set as left, and the +X direction is set as right. The front-back direction (depth direction) of the display system 2 is set as the Y-axis direction, where the −Y direction is set as front, and the +Y direction is set as rear. The vertical direction of the display system 2 is set as the Z-axis direction, where the +Z direction is set as upward, and the −Z direction is set as downward.

The display system 2 performs the rendition of a room (hereinafter, also referred to as "space") in a building such as a residential house. Specifically, as shown in FIG. 1, the display system 2 includes a frame body 4 and the display 60.

The frame body 4 is formed in a rectangular shape in an XZ plan view (+Y direction view). The frame body 4 is, for example, a window frame installed in a rectangular opening portion formed in a building wall (not shown). The frame body 4 has an upper wall portion 8, a lower wall portion 10, a left side wall portion 12, and a right side wall portion 14. The upper wall portion 8 and the lower wall portion 10 are disposed so as to face each other in the vertical direction (Z-axis direction). The left side wall portion 12 and the right side wall portion 14 are disposed so as to face each other in the left-right direction (X-axis direction). The lower wall portion 10 functions as a placing shelf for placing an object 16.

The user can place the object 16 on the lower wall portion 10 as a part of the interior of the room. In the example shown in FIG. 1, the object 16 is an ornamental foliage plant (cactus). However, the object 16 is not limited to an ornamental foliage plant, and may be, for example, a picture frame, a wristwatch, a book, a decorative accessory, a doll, a vase, a toy, a model, a painting or the like.

The display 60 is formed in a rectangular shape in an XZ plan view (the +Y direction view), and an outer peripheral portion of the display 60 is supported by the frame body 4.

The display 60 functions as, for example, a transparent outer window installed in an opening portion formed in the outer wall of the building or an indoor window installed between two adjacent rooms in the building. The display 60 also functions as a display panel on which an image is displayed. The above-mentioned object 16 is disposed near the display 60, specifically, near a lower portion of the display 60, and is disposed behind the display 60 (in the +Y direction).

In the present disclosure, the term "transparent" does not necessarily mean that transmissivity is 100%. Transmissivity is an intensity ratio of transmitted light (refracted light) to incident light (=transmitted light (refracted light)/incident light) expressed as a percentage. For example, a state where transmissivity is less than 100% or a state where transmissivity is about 80 to 90% may be defined as "transparent". Further, a translucent state where transmissivity for visible light (specifically, 550 nm) is 50% or more may be defined as "transparent".

As shown in FIG. 2, the display 60 includes a transparent display 61, a dimming panel 62, and a front glass 63. The transparent display 61 displays an image for performing rendition of a space or an object 16. The transparent display 61 is formed of a transmissive transparent display such as a transparent inorganic electro luminescence d(EL), a transparent organic EL, or a transmissive liquid crystal display. An optical adhesive sheet (Optical Clear Adhesive: OCA) 611 is adhered to a front (−Y direction) side surface of the transparent display 61. Further, an optical adhesive sheet 612 is also adhered to a rear (+Y direction) side surface of the transparent display 61.

The dimming panel 62 is adhered to a rear surface (+Y direction) side surface of the transparent display 61 with an optical adhesive sheet 612 interposed therebetween. The dimming panel 62 includes a dimming glass having substantially the same size as the transparent display 61 in an XZ plan view (+Y direction view). An antireflection film 621 is adhered to a rear (+Y direction) side surface of the dimming panel 62. The dimming panel 62 adjusts transmissivity of a dimming glass in terms of a unit of regions having the same size as pixels of the transparent display 61 by employing a technique such as a PDLC method which uses a liquid crystal and a polymer, a GHLC method which uses a liquid crystal and a dye, an electrochromic method, or Suspended Particle Device (SPD) method, for example.

The front glass 63 is adhered to a front (−Y direction) side surface of the transparent display 61 with the optical adhesive sheet (OCA) 611 interposed therebetween. An antireflection film 631 is adhered to a front (−Y direction) side surface of the front glass 63.

That is, a user can visually recognize an image displayed on the transparent display 61 from the front (−Y direction) through the front glass 63 and, at the same time, visually recognize the object 16 placed on the lower wall portion 10 through the front glass 63 and the transparent display 61. As a result, the rendition of a space where the object 16 and the image are in harmony is performed.

During a period in which an image is displayed on the transparent display 61, a user can visually recognize the object 16 located behind (+Y direction) the display 60 through the display 60 from the front (−Y direction) to the rear (+Y direction) of the display 60. That is, regardless of whether or not an image is displayed on the transparent display 61, a user in the room can see the object 16 and the scenery outside the room through the display 60 in the same manner as a window which is a fitting used in general.

An image displayed on the transparent display 61 may be either a still image or a moving image, or may be a video content which includes both a still image and a moving image. Alternatively, such an image may be, for example, an image which is linked with music or the like outputted from a speaker (not shown) installed in the frame body 4 or the like. As a result, without requiring a complicated operation by a user, an atmosphere of a space can be improved and hence, the comfort feeling of the user can be enhanced.

[1-2. Functional Configuration of Display System]

Figure 3:
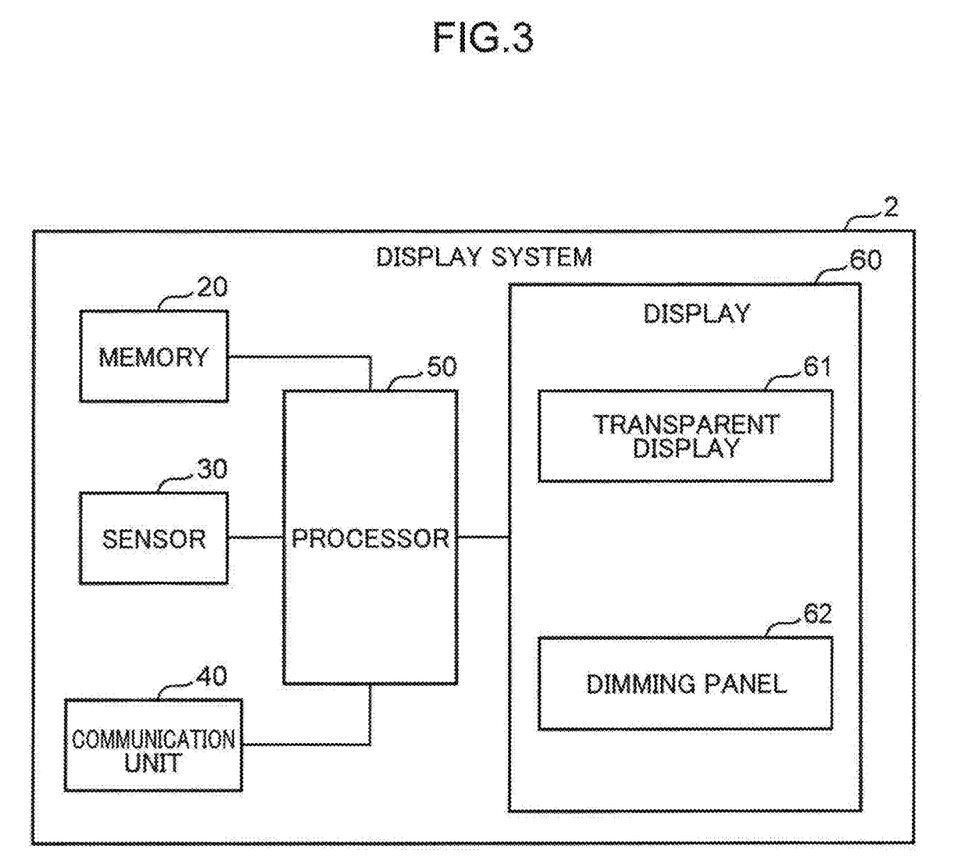
FIG. 3 is a block diagram showing a functional configuration of a display system according to the first embodiment.

Next, the functional configuration of the display system 2 according to the first embodiment will be described with reference to FIG. 3. FIG. 3 is a block diagram showing the functional configuration of the display system 2 according to the first embodiment. As shown in FIG. 3, the display system 2 includes the display 60 described above, a memory 20, a sensor 30, a communication unit 40, and a processor 50.

The memory 20 is a storage device such as a hard disk drive or a solid state drive. The memory 20 stores various types of data and information used by the display system 2 for rendition.

The sensor 30 is provided for detecting whether or not the object 16 located behind the display 60 (FIG. 1) exists. The sensor 30 is disposed, for example, on the upper wall portion 8 (FIG. 1) of the frame body 4 (FIG. 1). A portion where the sensor 30 is disposed is not limited to the upper wall portion 8. The sensor 30 may be disposed on, for example, any one of the lower wall portion 10 (FIG. 1), the left side wall portion 12 (FIG. 1), and the right side wall portion 14 (FIG. 1) of the frame body 4.

The sensor 30 is, for example, a camera sensor having an imaging element. In this case, the sensor 30 captures an image of the rear of the display 60 (FIG. 1) and outputs image data which indicates the captured image to the processor 50. The sensor 30 may have an infrared sensor in addition to the imaging element. Further, the sensor 30 may not be mounted on the display system 2.

The sensor 30 may be a distance sensor. In this case, the sensor 30 measures a distance to the object 16 located behind (+Y direction) the dimming panel 62, and outputs data which indicates the detection of the object 16 to the processor 50 when the measured distance is within a predetermined range. The distance sensor measures the distance to the object 16 using, for example, a spatial recognition technique such as Depth From Defocus technology. The Depth From Defocus technology is a technology which recognizes a space from a plurality of live images with different focus positions, and calculates a distance to an object.

The communication unit 40 is a communication interface circuit which allows the processor 50 to perform communication with an operating device such as a smartphone or a touch panel via a network (not shown). Various types of data are transmitted and received between the operating device and the processor 50 by the communication unit 40.

The processor 50 is an electric circuit such as a CPU or an FPGA. The processor 50 controls the memory 20, the sensor 30, the communication unit 40, and the display 60.

For example, via the communication unit 40, the processor 50 acquires: image information regarding an image for rendition (hereinafter referred to as a rendition image) to be displayed on the transparent display 61, the image information which a user inputs by the operating device; object type information which indicates the type of an object (hereinafter referred to as a rendition target) which is disposed behind the dimming panel 62 and is to be visually recognized together with the rendition image; and relevance information which indicates the relevance between the rendition image and the rendition target. In the present embodiment, the relevance indicated by the relevance information is expressed by a numerical value, and the higher the numerical value, the higher the relevance between the rendition image and the rendition target is.

The image information includes: image data which indicates the rendition image, the content (for example, "moon") and the type (for example, "celestial body") of the rendition image, and a display position (for example, "(X1, Z1)") of the rendition image on the transparent display 61. The processor 50 may acquire image data on the network as image data which indicates the rendition image. Specifically, a case is assumed where the processor 50 acquires a search instruction command including a keyword for searching a rendition image which a user inputs using the operating device via the communication unit 40. In this case, the processor 50 may control the communication unit 40 to search for an image on the network by using a keyword contained in the acquired search instruction command. Then, when an image corresponding to the keyword exists as a result of the search, the processor 50 may acquire (download) image data which indicates an image corresponding to the keyword via the communication unit 40.

Figure 4:
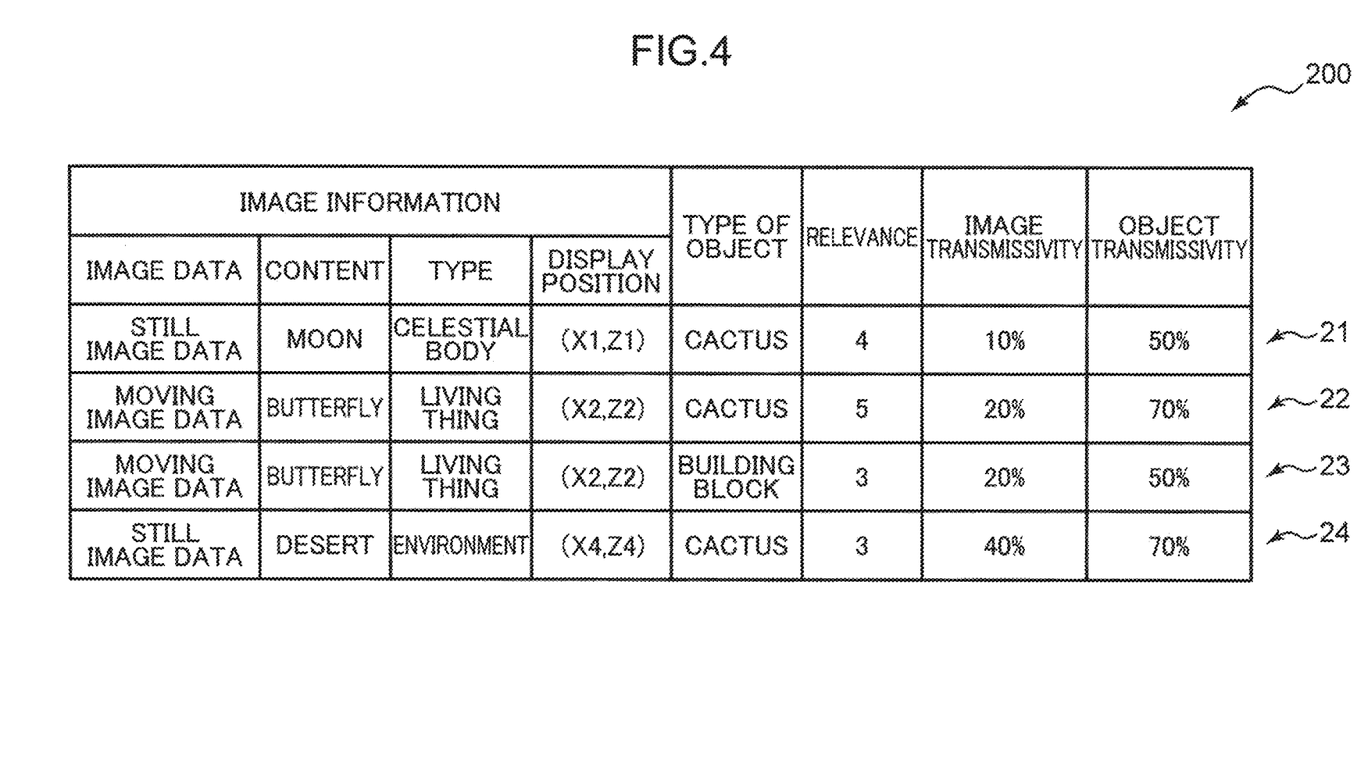
FIG. 4 is a view showing an example of a rendition table.

FIG. 4 is a view showing an example of a rendition table 200. For example, as shown in FIG. 4, the memory 20 includes the rendition table 200 which stores image information, object type information, relevance information, transmissivity of a region of the dimming panel 62 located behind a region on which a rendition image is displayed (hereinafter, referred to as image transmissivity), and transmissivity of a region of the dimming panel 62 located in front of a rendition target (hereinafter referred to as object transmissivity) in a correlated manner.

The processor 50 stores the image information, the object type information, and the relevance information acquired via the communication unit 40 in the rendition table 200 in a correlated manner. The processor 50 determines the image transmissivity and the object transmissivity of each record in the rendition table 200 in accordance with the following rules R1 to R3.

Rule R1: Object transmissivity is set higher than image transmissivity.

Rule R2: As the relevance between the rendition image and the rendition target is higher, a degree at which object transmissivity is set higher than image transmissivity is increased.

Rule R3: In a plurality of records having the same relevance between a rendition image and a rendition target, image transmissivity of the record related to a predetermined type of rendition image is set higher than image transmissivity of the record related to a rendition image of a type different from the predetermined type. In this embodiment, it is assumed that the predetermined type in the rule R3 is "environment". However, the predetermined type is not limited thereto.

For example, as shown in FIG. 4, the processor 50 determines the object transmissivity (for example, "50%") of all records 21 to 24 to be higher than the image transmissivity (for example, "10%") in accordance with the rule R1.

In the rendition table 200 shown in FIG. 4, the relevance between the rendition image and the rendition target is set higher such as "5", "4", "3", and "3" in the order of records 22, 21, 23, and 24. Therefore, in accordance with the rule R2, the processor 50 sets a degree of an increase of the object transmissivity higher than the image transmissivity in the order of records 22, 21, 23, and 24, that is, "50% (=70%−20%)", "40%(=50%−10%)", "30% (=50%−20%)", and "30% (=70%−40%)".

In the rendition table 200 shown in FIG. 4, the relevance "3" between the rendition image and the rendition target is equal between the record 24 and the record 23. The type of the rendition image corresponding to the record 24 is "environment", and the type of the rendition image corresponding to the record 23 is "living thing". Therefore, in accordance with the rule R3, the processor 50 sets the image transmissivity "40%" of the record 24 higher than the image transmissivity "20%" of the record 23.

For example, the records 21, 22, and 24 in FIG. 4 are used for performing the rendition where, when an object 16 whose type is "cactus" is disposed behind the dimming panel 62, rendition images whose contents are "moon", "butterfly", and "desert" are displayed on the transparent display 61 while using the object 16 as the rendition target.

Further, the records 22 and 23 in FIG. 4 are used for performing the rendition where, when an object 16 of the type "cactus" and an object 16 of the type "building block" are disposed behind the dimming panel 62, a rendition image of the content of which is a moving image of "butterfly" is displayed on a transparent display 61 while using two objects 16 as rendition targets. That is, in performing the rendition using one rendition image with respect to a plurality of rendition targets, in the image information related to the one rendition image, object type information which indicates the type of each rendition target and the relevance information which indicates the relevance between such one rendition image and each rendition target are stored (defined) in a correlated manner.

The processor 50 detects the object 16 located behind the display 60. Specifically, the processor 50 grasps the type of the object 16 located behind the display 60 and the region of the dimming panel 62 located in front of the object 16 by using the sensor 30 or the like.

For example, it is assumed that the sensor 30 is a camera sensor. In this case, the processor 50 detects a profile of the object 16 contained in an image which image data inputted from the sensor 30 indicates and, at the same time, determines the type of the object 16 by using machine learning technique such as Mask Regions with Convolutional Neural Network (R-CNN). The processor 50 grasps a region of the dimming panel 62 located in front of the object 16 from the profile of the detected object 16.

The Mask R-CNN is one of the deep learning techniques, and is a technique which can simultaneously detect an object in general and perform segmentation of the object. In the Mask R-CNN, it is determined which object class a segment belongs for each pixel in an image, and the profile of the object 16 contained in the image is detected. The profile of the detected object 16 and the information indicating the characteristics of the object stored in advance in the memory 20 are collated with each other so that the type of the object 16 is determined.

The processor 50, by controlling the communication unit 40, may grasp the type of the object 16 contained in image data inputted from the sensor 30 by using a service for determining the type of the object contained in image data, the service being provided by an external device connected to the network. In this case, a processing load of the processor 50 can be reduced. Further, it is unnecessary to store the information indicating the characteristics of an object in the memory 20 in advance and hence, the storage capacity of the memory 20 can be saved.

In addition, it is assumed that the sensor 30 is a distance sensor. In this case, after data which indicates that the presence of the object 16 is detected is inputted to the processor 50 from the sensor 30, the processor 50 stands by until the processor 50 acquires, via the communication unit 40, information indicating the type of the object 16 and information indicating a region of the dimming panel 62 located in front of the object 16, the pieces of information being input by a user using an operating device or the like.

When the sensor 30 is not mounted on the display system 2, an image of the object 16 located behind the dimming panel 62 may be captured by a camera sensor, included in an external device of the display system 2, such as a camera sensor of a smartphone owned by a user, for example. Then, the communication unit 40 may receive image data indicating the captured image via the network. Then, as in the case where the sensor 30 is a camera sensor, the processor 50 may grasp the type of the object 16 and a region of the dimming panel 62 located in front of the object 16 by using the image data acquired from the communication unit 40.

The processor 50 performs rendition processing for rendering a space in which the object 16 located behind the dimming panel 62 and the rendition image are in harmony.

Figure 5:
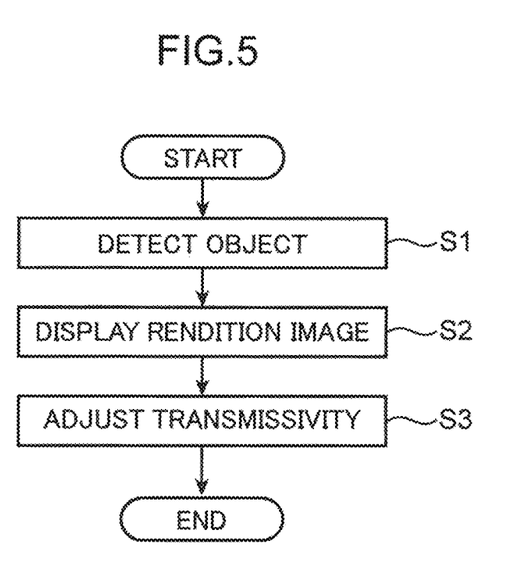
FIG. 5 is a flowchart showing a flow of rendition processing.

The details of the rendition processing will be described hereinafter. FIG. 5 is a flowchart showing the flow of the rendition processing. In the following description, it is assumed that the rendition table 200 shown in FIG. 4 is stored in the memory 20 in advance.

As shown in FIG. 5, when the processor 50 detects the object 16 located behind the dimming panel 62 (step S1), the processor 50 performs rendition processing formed of steps S2 and S3 by setting the object 16 as a rendition target. Specifically, in step S1, the processor 50 grasps, as described above, the type of the object 16 located behind the display 60 and a region of the dimming panel 62 located in front of the object 16.

When the processor 50 starts the rendition processing, the processor 50 displays a rendition image corresponding to the type of the rendition target grasped in step S1 on the transparent display 61 (step S2).

Specifically, in step S2, the processor 50 acquires a record which contains the type of the rendition target grasped in step S1 from the rendition table 200 (FIG. 4). Here, it is assumed that there are a plurality of records each of which contains the type of rendition target grasped in step S1. In this case, the processor 50 acquires one or more records by a predetermined method such as, for example, acquiring one record which is stored last, acquiring one record at random, or acquiring a predetermined number of records counted back from the record stored last. The processor 50 controls the transparent display 61 such that the rendition images, indicated by the image data contained in the respective acquired records, are displayed at display positions of the rendition images contained in the respective acquired records.

Next, the processor 50 sets the transmissivity of a region of the dimming panel 62 located in front of the rendition target grasped in step S1 higher than the transmissivity of regions of the dimming panel 62 located behind the regions on which the respective rendition images are displayed. The processor 50 makes a degree of increase of transmissivity different in accordance with the combination of the rendition image and the rendition target (step S3).

Specifically, as described above, in the rendition table 200 (FIG. 4), the image transmissivity and the object transmissivity higher than the image transmissivity, both set in accordance with the rule R1, are stored in a correlated manner with the image information related to the rendition images and the object type information indicating the types of the rendition targets. That is, in the rendition table 200, the image transmissivity and the object transmissivity set higher than the image transmissivity are stored in a correlated manner in accordance with the combination of the performance rendition image and the rendition target.

Therefore, in step S3, the processor 50 adjusts the transmissivity of the region of the dimming panel 62 located behind the region on which the rendition image is displayed in step S2 to the image transmissivity in accordance with the combination of the rendition image and the rendition target, which is contained in the record acquired from the rendition table 200 in step S2. The processor 50 adjusts the transmissivity of the region of the dimming panel 62 located in front of the rendition target which is grasped in step S1 to the object transmissivity higher than the image transmissivity in accordance with the combination of the rendition image and the rendition target, which is contained in the record acquired from the rendition table 200 in step S2.

RENDITION EXAMPLE 1

Figure 6:
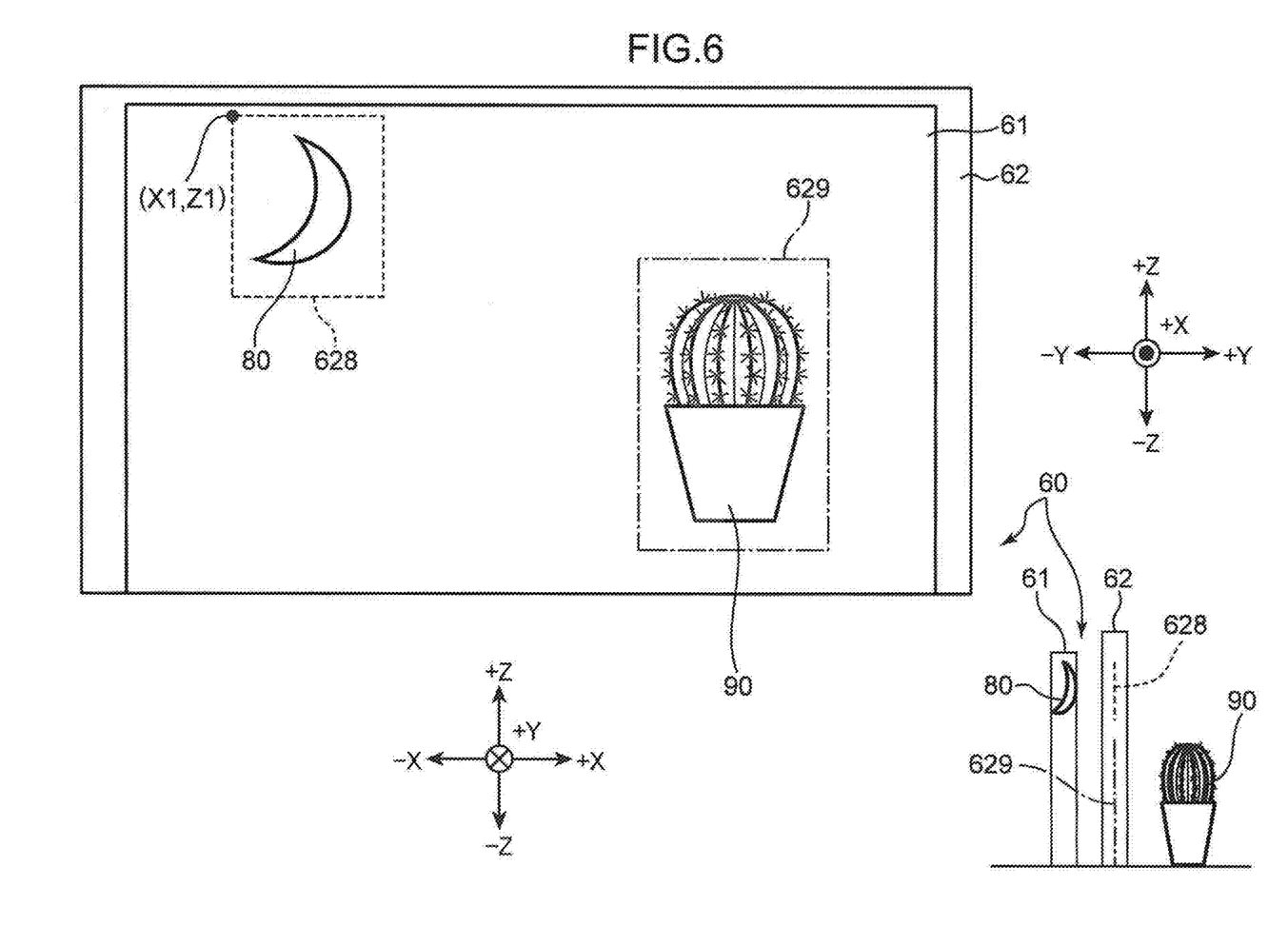
FIG. 6 is a view showing a first specific example of the rendition processing.
Figure 7:
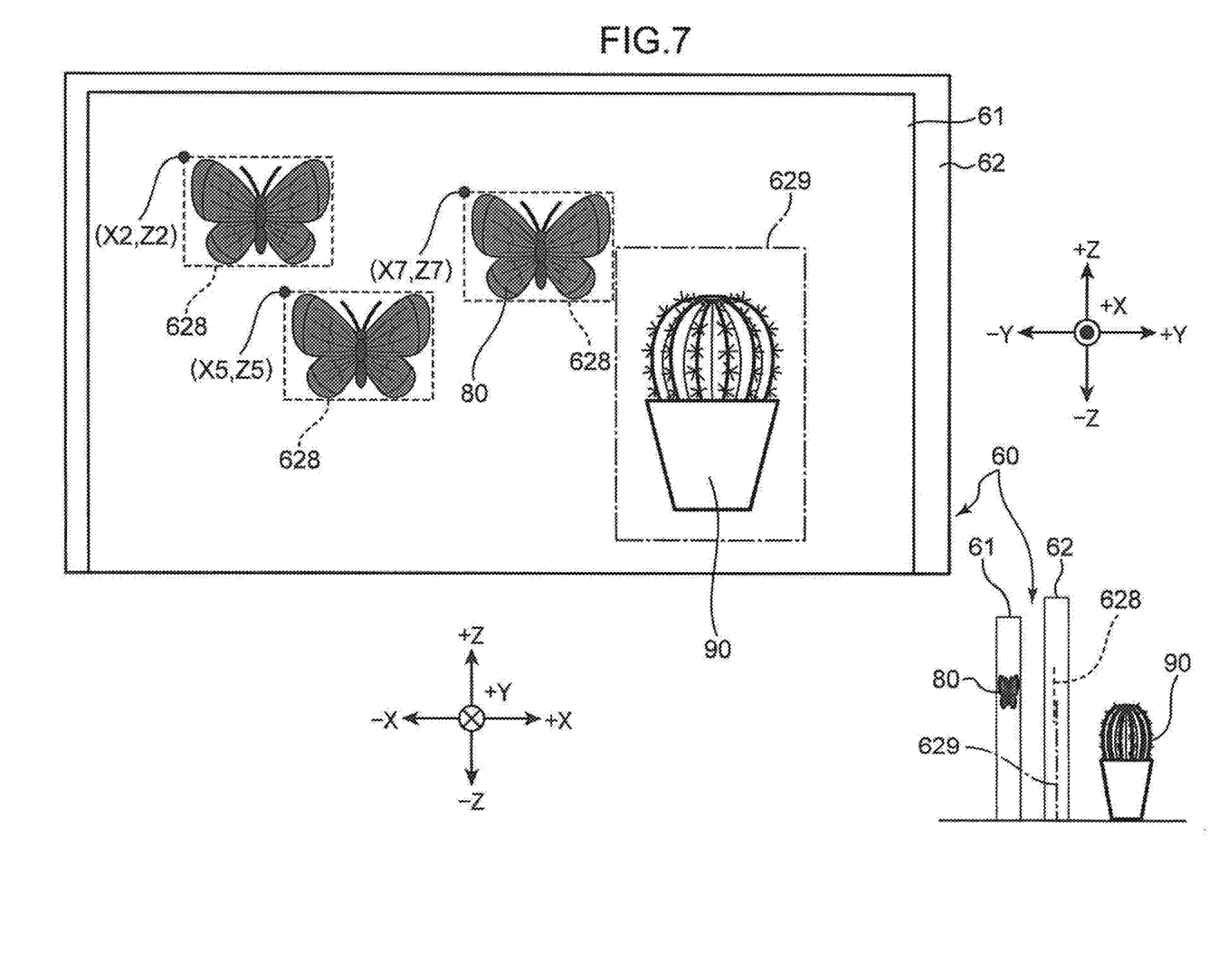
FIG. 7 is a view showing a specific example of rendition processing to be compared with the first specific example of the rendition processing.

Hereinafter, the first specific example of the rendition processing will be described with reference to FIGS. 6 and 7. FIG. 6 is a view showing a first specific example of the rendition processing. FIG. 7 is a view showing a specific example of rendition processing to be compared with the first specific example of the rendition processing (hereinafter referred to as a rendition example 1). The left views in FIGS. 6 and 7 are front views of the display 60 as viewed from the front (−Y direction), and the right views in FIGS. 6 and 7 are side views of the display 60 and the rendition target 90 as viewed from the right (+X direction).

In the rendition example 1, the description is made with respect to the rendition processing which is performed in the case where the type of the rendition target 90 is grasped as "cactus" in step S1, and the record 21 where the content of the rendition image 80 is "moon" is acquired from the rendition table 200 shown in FIG. 4 in step S2. Further, as a specific example to be compared with the rendition example 1, the description is made with respect to the rendition processing which is performed in the case where the type of the rendition target 90 is grasped as "cactus" in step S1, and the record 22 where the content of the rendition image 80 is "butterfly" is acquired from the rendition table 200 shown in FIG. 4 in step S2.

When the record 21 is acquired in step S2, as shown in the left and right views in FIG. 6, the processor 50 displays the rendition image 80, the content of which is "moon", indicated by still image data contained in the record 21 on the transparent display 61 at a display position "(X1, Z1)" contained in the record 21.

Next, in step S3, the processor 50 controls the dimming panel 62 such that the transmissivity of a region 628 of the dimming panel 62 located behind the region on which the rendition image 80 is displayed becomes the image transmissivity "10%" contained in the record 21. The processor 50 also controls the dimming panel 62 such that the transmissivity of a region 629 of the dimming panel 62 located in front of the rendition target 90 which is grasped in step S1 becomes the object transmissivity "50%" contained in the record 21.

On the other hand, when the record 22 is acquired in step S2, as shown in the left and right views in FIG. 7, the processor 50 starts displaying of the rendition image 80 (moving image), with the content "butterfly", indicated by moving image data contained in the record 22 from a display position "(X2, Z2)", on the transparent display 61, contained in the record 22. Then, the processor 50 controls the transparent display 61 so as to move the display position of the rendition image 80, with the content "butterfly", from "(X2, Z2)", through "X5, Z5", to "(X7, Z7)" based on the moving image data contained in the record 22.

Next, in step S3, the processor 50 adjusts the transmissivity of the region 628 of the dimming panel 62 located behind the region on which the rendition image 80 is displayed to the image transmissivity "20%" contained in the record 22 by controlling the dimming panel 62. The processor 50 also adjusts the transmissivity of the region 629 located in front of the rendition target 90 to the object transmissivity "70%" contained in the record 22.

As described above, in the rendition processing using the record 21, the processor 50 sets the transmissivity "50%" of the region 629 located in front of the rendition target 90 higher than the transmissivity "10%" of the region 628 located behind the region on which the rendition image 80 is displayed by "40% (=50%−10%)". On the other hand, in the rendition processing using the record 22, the processor 50 sets the transmissivity "70%" of the region 629 located in front of the rendition target 90 higher than the transmissivity "20%" of the region 628 located behind the region on which the rendition image 80 is displayed by "50% (=70%−20%)". That is, the processor 50 makes a degree of setting the transmissivity of the region 629 higher than the transmissivity of the region 628 differ in accordance with the combination of the rendition image 80 and the rendition target 90.

Further, when the display position of the rendition image 80, with the content "butterfly", is moved, the processor 50 changes the transmissivity of the region 628 of the dimming panel 62 located behind the region on which the rendition image 80 is displayed following the movement of the display position of the rendition image 80. As a result, even when the rendition image 80 is a moving image and the display position of the rendition image 80 moves, the visibility of the rendition image 80 can always be improved. The processor 50 may, following the movement of the display position of the rendition image 80, increase the transmissivity of the region 628 located behind the region on which the rendition image 80 has been displayed at a predetermined rate before such movement of the display position of the rendition image 80. In this case, the visibility behind the dimming panel 62 can be improved.

The processor 50 may change the transmissivity of the dimming panel 62 in accordance with a distance from the region on which the rendition image 80 is displayed. For example, in the left view in FIG. 6, the processor 50 may increase or lower the transmissivity as the region of the dimming panel 62 is away from the region 628 located behind the region on which the rendition image 80, with the content "moon", is displayed. With such processing, the processor 50 can perform a rendition in which the rendition image 80 is in harmony with the space.

The processor 50 may change the transmissivity of the dimming panel 62 in accordance with a distance from the region 629 located in front of the rendition target 90. For example, in the left view in FIG. 6, the processor 50 may increase or lower the transmissivity as the region of the dimming panel 62 is farther away from the region 629 located in front of the rendition target 90 of the type "cactus". With such processing, the processor 50 can perform a rendition in which the rendition target 90 is in harmony with the space.

That is, in these cases, a boundary between the rendition image 80 and the space and a boundary between the rendition target 90 and the space can be blurred. As a result, it is possible to reduce a sense of discomfort given to a user who is viewing the display 60.

RENDITION EXAMPLE 2

Figure 8:
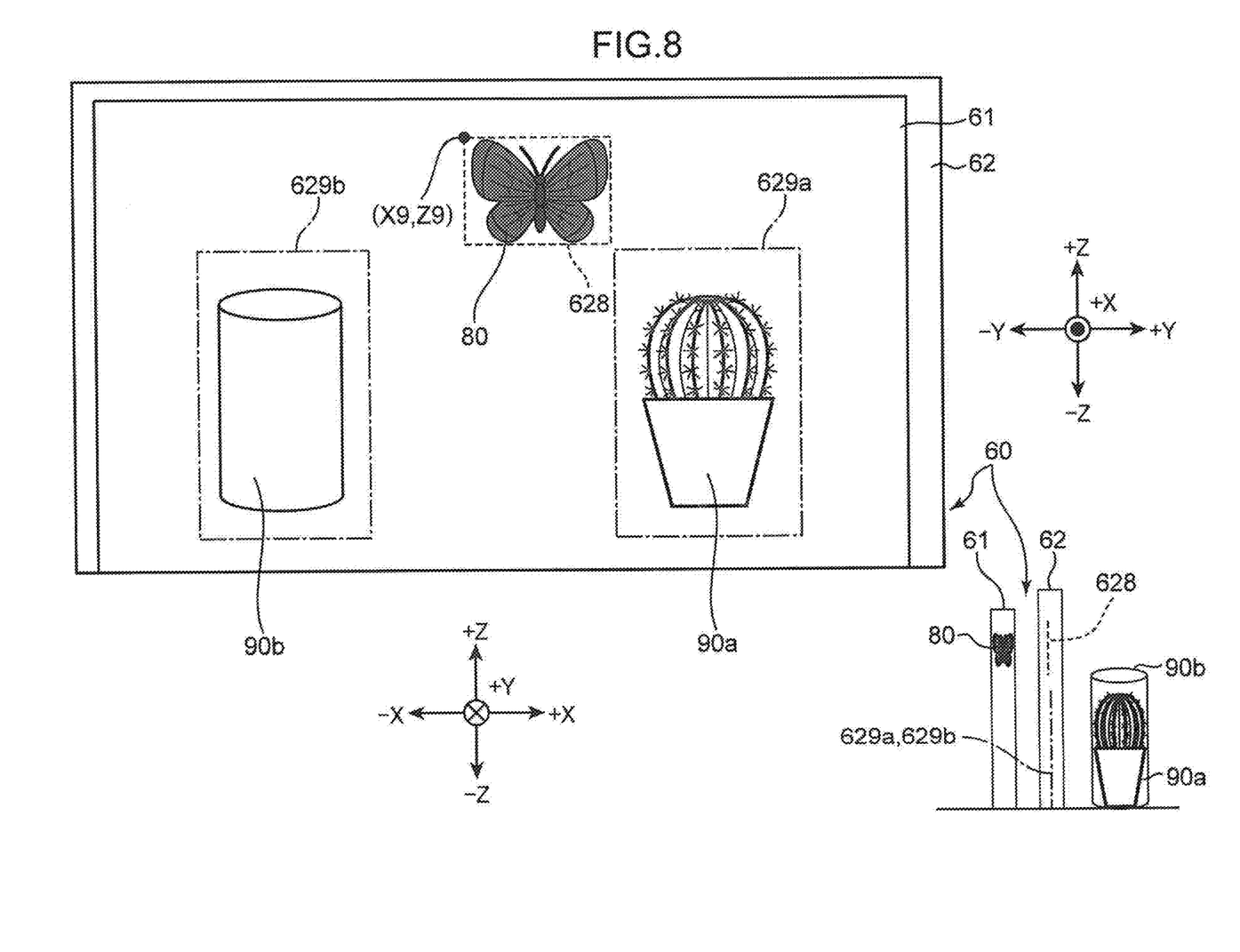
FIG. 8 is a view showing a second specific example of the rendition processing.

Hereinafter, a second specific example of the rendition processing will be described with reference to FIG. 8. FIG. 8 is a view showing the second specific example of the rendition processing (hereinafter, referred to as a rendition example 2). The left view in FIG. 8 is a front view of the display 60 as viewed from the front (−Y direction), and the right view of FIG. 8 is a side view of the display 60, a first rendition target 90a and a second rendition target 90b as viewed from the right (+X direction).

In the rendition example 2, the description is made with respect to a case where a rendition of a space is performed such that one rendition image 80, the first rendition target 90a (first object), and the second rendition target 90b (second object) having a lower relevance with the rendition image 80 than the first rendition target 90a are in harmony.

Specifically, in step S1, it is assumed that the type of the first rendition target 90a is "cactus" and the type of the second rendition target 90b is "building block". In step S2, the records each of which contains the type of each rendition target 90 grasped in step S1 are acquired one by one from the rendition table 200 shown in FIG. 4. For example, in step S2, it is assumed that the record 22 which contains the type "cactus" of the first rendition target 90a, and the record 23 which contains the same image information as the record 22 and the type "building block" of the second rendition target 90b are acquired. The relevance "3" contained in the record 23 is lower than the relevance "5" contained in the record 22. That is, the second rendition target 90b of the type "building block" is less relevant to the rendition image 80 than the first rendition target 90a of the type "cactus".

In this case, as shown in the left and right views in FIG. 8, the processor 50 starts displaying of the rendition image 80 (moving image), with the content "butterfly", indicated by moving image data contained in the record 23 from the display position "(X2, Z2)", on the transparent display 61, contained in the record 22 (23). Then, the processor 50, by controlling the transparent display 61, moves the display position of the rendition image 80, with the content "butterfly", to "(X9, Z9)" as shown in the left view in FIG. 8, for example, based on the moving image data contained in the record 22.

Next, in step S3, the processor 50 controls the dimming panel 62 such that the transmissivity of the region 628 of the dimming panel 62 located behind the region on which the rendition image 80 is displayed becomes the image transmissivity "20%" contained in the record 22(23). When the image transmissivities contained in the plurality of records acquired in step S2 are different, the processor 50 acquires one image transmissivity by a predetermined method such as acquiring the minimum image transmissivity, for example, and adjusts the transmissivity of the region 628 to the acquired image transmissivity.

The processor 50 also controls the dimming panel 62 such that the transmissivity of the region 629a of the dimming panel 62 located in front of the first rendition target 90a grasped in step S1 becomes the object transmissivity "70%" contained in the record 22. The processor 50 also controls the dimming panel 62 such that the transmissivity of the region 629b of the dimming panel 62 located in front of the second rendition target 90*b* which is grasped in step S1 becomes the object transmissivity "50%" contained in the record 23.

As described above, when the processor 50 detects the first rendition target 90*a* and the second rendition target 90*b* having a lower relevance with the rendition image 80 than the first rendition target 90*a*, both of which are located behind the dimming panel 62, the processor 50 adjusts the transmissivity of the region 629*a* located in front of the first rendition target 90*a* to the transmissivity "70%" which is higher than the transmissivity "50%" of the region 629*b* located in front of the second rendition target 90*b*. As a result, the processor 50 can perform the rendition in which the second rendition target 90*b*, which has low relevance with the rendition image 80 and is not desirable to be viewed together with the rendition image 80, is blurred, and the first rendition target 90*a*, which has high relevance with the rendition image 80 and is desirable to be viewed together with the rendition image 80, is made conspicuous.

For example, it is assumed that when objects 16 of the types "drawer", "cactus", and "clock" exist behind the dimming panel 62, the rendition of displaying the rendition image 80, with the content "cat", is performed while setting these three objects 16 as the rendition targets 90. In addition, it is assumed that a record, in which the object type information of the type "drawer" and the relevance information showing the highest relevance are correlated with the image information related to the rendition image 80 with the content "cat", is stored in the rendition table 200.

In this case, the transmissivity of the region 629 located in front of the rendition target 90 of the type "drawer" can be increased, and the transmissivity of the region 629 located in front of the rendition targets 90 of the type "cactus" and "clock" where the relevance with the rendition image 80, with the content "cat", is lower than the rendition target 90 of the type "drawer" can be lowered. As a result, it is possible to perform the rendition where what is not desirable to be viewed is blurred and what is desirable be to viewed is made conspicuous.

RENDITION EXAMPLE 3

Figure 9:
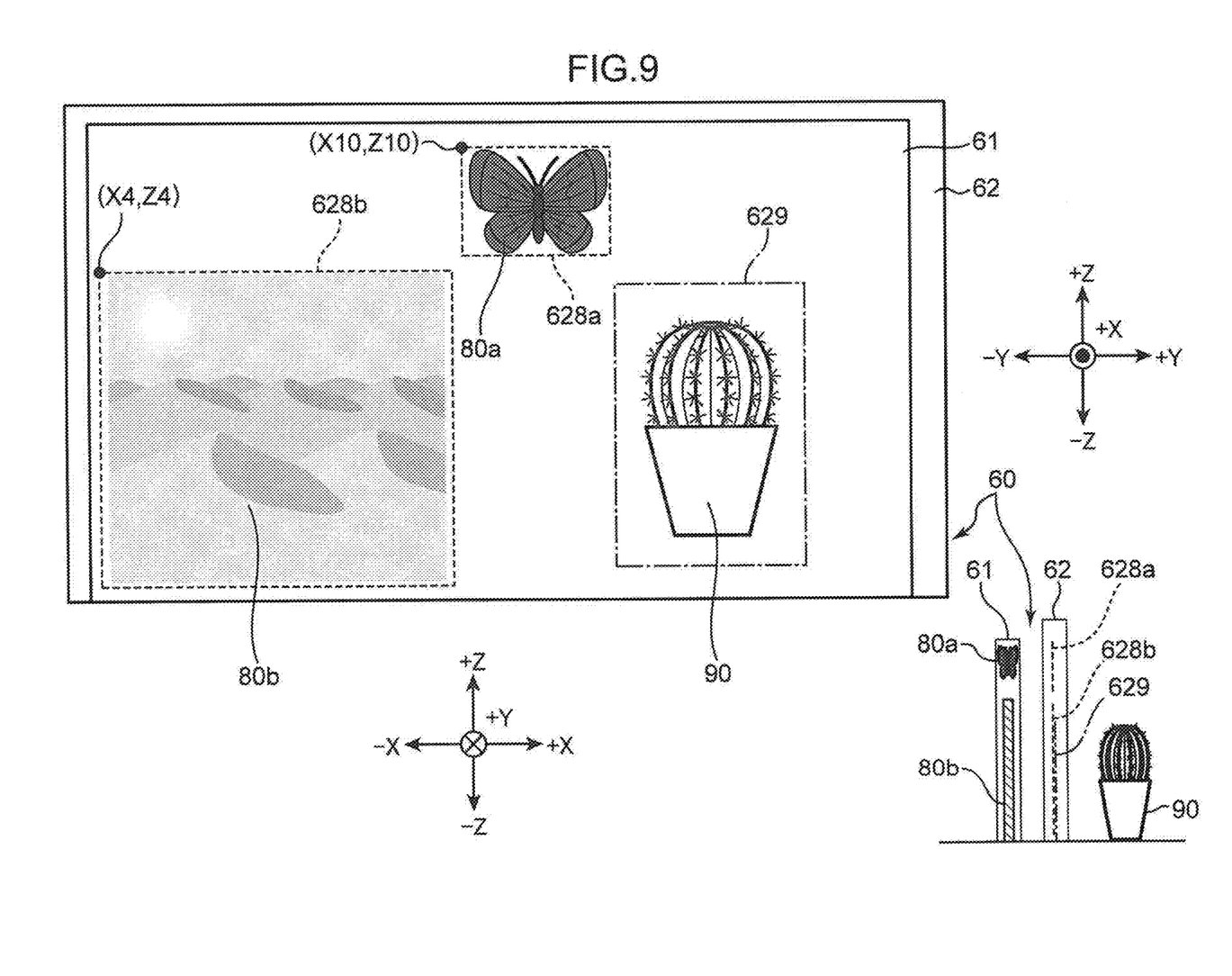
FIG. 9 is a view showing a third specific example of the rendition processing.

Hereinafter, a third specific example of the rendition processing will be described with reference to FIG. 9. FIG. 9 is a view showing the third specific example of the rendition processing (hereinafter, referred to as a rendition example 3). The left view in FIG. 9 is a front view of the display 60 as viewed from the front (−Y direction), and the right view in FIG. 9 is a side view of the display 60 and the rendition target 90 as viewed from the right (+X direction).

In the rendition example 3, the description is made with respect to a case where a rendition of a space is performed such that one rendition target 90, a first rendition image 80*a* (first image), and a second rendition image 80*b* (second image) are in harmony.

Specifically, in step S1, it is assumed that the type of the rendition target 90 is grasped as "cactus". In step S2, it is assumed that two records 22 and 24 which contain the type "cactus" of the rendition target 90 grasped in step S1 are acquired from the rendition table 200 (FIG. 4) shown in FIG. 4.

In this case, as shown in the left and right views in FIG. 9, the processor 50 starts displaying of the first rendition image 80*a* (moving image), with the content "butterfly", indicated by moving image data contained in the record 22 from the display position "(X2, Z2)", on the transparent display 61, contained in the record 22. Then, the processor 50, by controlling the transparent display 61, moves the display position of the rendition image 80, with the content "butterfly", to "(X10, Z10)" as shown in the left view in FIG. 9, for example, based on the moving image data contained in the record 22. The processor 50 displays the second rendition image 80*b*, with the content "desert", indicated by the still image data contained in the record 24 on the transparent display 61 at the display position "(X4, Z4)" contained in the record 24.

Next, in step S3, the processor 50 adjusts the transmissivity of the region 628*a* of the dimming panel 62 located behind the region on which the first rendition image 80*a* is displayed to the image transmissivity "20%" contained in the record 22. The processor 50 adjusts the transmissivity of the region 628*b* of the dimming panel 62 located behind the region on which the second rendition image 80*b* is displayed to the image transmissivity "40%" contained in the record 24.

The processor 50 adjusts the transmissivity of a region 629 of the dimming panel 62 located in front of the rendition target 90 which is grasped in step S1 to object transmissivity "70%" contained in the record 22 (24). When the object transmissivities contained in the plurality of records acquired in step S2 are different, the processor 50 acquires one object transmissivity by a predetermined method such as acquiring the maximum image transmissivity, for example, and adjusts the transmissivity of the region 629 to the acquired object transmissivity.

As described above, when the processor 50 performs the rendition using the first rendition image 80*a* and the second rendition image 80*b*, the processor 50 makes the transmissivity "20%" of the region 628*a* of the dimming panel 62 located behind the region on which the first rendition image 80*a* is displayed and the transmissivity "70%" of the region 628*b* of the dimming panel 62 located behind the region on which the second rendition image 80*b* is displayed different from each other. For example, the content of the first rendition image 80*a* may be the "crosspieces of paper sliding door", and the content of the second rendition image 80*b* may be the "paper of paper sliding door".

In step S3, the processor 50 may set the transmissivity of the region 628*a* of the dimming panel 62 located behind the region on which the first rendition image 80*a* is displayed further lower than image transmissivity stored in the rendition table 200. Similarly, the processor 50 may set the transmissivity of the region 628*b* located behind the region on which the second rendition image 80*b* is displayed further higher than the image transmissivity stored in the rendition table 200.

Further, the processor 50 may set the transmissivity of the region 628*a* located behind the region on which the first rendition image 80*a* is displayed higher or lower than the transmissivity of the region 628*b* located behind the region on which the second rendition image 80*b* is displayed in accordance with the type of the first rendition image 80*a* and the second rendition image 80*b*. For example, the processor 50 may set the transmissivity of the region 628*a* located behind the region on which the first rendition image 80*a*, with the content "tropical fish" and the type "living thing", is displayed lower than the transmissivity of the region 628*b* located behind the region on which the second rendition image 80*b*, with the content "aquarium" and the type "environment", is displayed. Thereby, the rendition which is more harmonious with the space may be realized.

As described above, according to the above embodiment, the transmissivity of the region 629 of the dimming panel 62 located in front of the rendition target 90 is set higher than the transmissivity of the region 628 of the dimming panel 62 located behind the region on which the rendition image 80 is displayed, at a degree corresponding to the combination of the rendition image 80 and the rendition target 90. Therefore, in this embodiment, in consideration of the visibility when a user views the rendition image 80 and the rendition target 90 in combination, it is possible to properly set the transmissivity of the region 629 located in front of the rendition target 90 higher than the transmissivity of the region 628 located behind the region on which the rendition image 80 is displayed. Thereby, in this aspect, the visibility of both the rendition image 80 and the rendition target 90 can be ensured.

<Modification>

(1) In the above embodiment, the description has been made with respect to the example in which the processor 50 determines the image transmissivity and the object transmissivity in accordance with the rules R1 to R3 before the start of the rendition processing, and the processor 50 stores the determined image transmissivity and the determined object transmissivity in the rendition table 200 (FIG. 4) provided in the memory 20 in advance. However, instead of such a configuration, the configuration of the rendition table 200 (FIG. 4) may be changed to the configuration that stores neither the image transmissivity nor the object transmissivity. In conformity with such a configuration, after the processor 50 performs the processing in step S2 and before the processor 50 performs the processing in step S3, the processor 50 may determine the image transmissivity and the object transmissivity to be contained in each record in accordance with the rules R1 to R3 based on the image information, the object type information, and the relevance information of each record stored in the changed rendition table 200 (FIG. 4).

(2) The rendition table 200 (FIG. 4) may be configured so as not to contain the type of rendition image (for example, "celestial body"), and the processor 50 may be configured to determine the image transmissivity and the object transmissivity following the rules R1 and R2 but not following the rule R3.

INDUSTRIAL APPLICABILITY

In the present disclosure, it is possible to ensure the visibility of both the display image of the display having transmitting property and capable of adjusting transmissivity and the object behind the display. Accordingly, the present disclosure is useful in the rendition of a space in a building such as a residential house, for example.

The invention claimed is:

1. A display system comprising:
a transparent display;
a dimming panel located behind the transparent display and capable of adjusting transmissivity; and
a processor,
wherein, when the processor detects an object located behind the dimming panel, the processor displaying an image on the transparent display, setting the transmissivity of a region of the dimming panel located in front of the object higher than the transmissivity of a region of the dimming panel located behind a region on which the image is displayed, and making different a degree of an increase of the transmissivity in accordance with combination of the image and the object, and
wherein in a case where the object is formed of a plurality of objects, and a relevance is defined between the image and each of the plurality of objects, when the processor detects a first object located behind the dimming panel, and a second object located behind the dimming panel and having a lower relevance with the image than the first object, the processor setting the transmissivity of the region of the dimming panel located in front of the first object higher than the transmissivity of the region of the dimming panel located in front of the second object.

2. The display system according to claim 1, wherein, when a display position of the image is moved, following the movement of the display position of the image, the processor changing the transmissivity of the region of the dimming panel located behind the region on which the image is displayed.

3. The display system according to claim 1, wherein the processor changing the transmissivity of the dimming panel in accordance with a distance from the region located behind the region on which the image is displayed.

4. The display system according to claim 1, wherein the processor changing the transmissivity of the dimming panel in accordance with a distance from the region located in front of the object.

5. The display system according to claim 1, wherein
the image includes a first image and a second image, and
the processor making the transmissivity of the region of the dimming panel located behind the region on which the first image is displayed and the transmissivity of the region of the dimming panel located behind the region on which the second image is displayed different from each other.

6. A display control method which uses a display system including: a transparent display, a dimming panel located behind the transparent display and capable of adjusting transmissivity, and a processor,
wherein, when the processor detects an object located behind the dimming panel, the processor displaying an image on the transparent display, setting the transmissivity of a region of the dimming panel located in front of the object higher than the transmissivity of a region of the dimming panel located behind a region on which the image is displayed, and making different a degree of an increase of the transmissivity in accordance with combination of the image and the object, and
wherein in a case where the object is formed of a plurality of objects, and a relevance is defined between the image and each of the plurality of objects, when the processor detects a first object located behind the dimming panel, and a second object located behind the dimming panel and having a lower relevance with the image than the first object, the processor setting the transmissivity of the region of the dimming panel located in front of the first object higher than the transmissivity of the region of the dimming panel located in front of the second object.

* * * * *